(12) United States Patent
Fang et al.

(10) Patent No.: US 12,222,615 B2
(45) Date of Patent: Feb. 11, 2025

(54) DISPLAY PANEL AND DISPLAY DEVICE

(71) Applicant: BOE Technology Group Co., Ltd., Beijing (CN)

(72) Inventors: Zheng Fang, Beijing (CN); Xue Dong, Beijing (CN); Pengxia Liang, Beijing (CN); Jiahui Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/556,942

(22) PCT Filed: Oct. 22, 2021

(86) PCT No.: PCT/CN2021/125547
§ 371 (c)(1),
(2) Date: Oct. 24, 2023

(87) PCT Pub. No.: WO2022/227435
PCT Pub. Date: Nov. 3, 2022

(65) Prior Publication Data
US 2024/0210770 A1    Jun. 27, 2024

(30) Foreign Application Priority Data
Apr. 26, 2021   (CN) .......................... 202110453800.9

(51) Int. Cl.
*G02F 1/1362*    (2006.01)
*G02F 1/1368*    (2006.01)
(Continued)

(52) U.S. Cl.
CPC .. *G02F 1/136209* (2013.01); *G02F 1/136286* (2013.01); *G02F 1/1368* (2013.01); *G06F 3/011* (2013.01); *G06T 19/006* (2013.01)

(58) Field of Classification Search
CPC ............. G02F 1/136209; G02F 1/1368; G02F 1/134372; G06F 3/011; G06T 19/006
See application file for complete search history.

(56) References Cited

U.S. PATENT DOCUMENTS 5,721,599 A      2/1998  Cheng
2002/0101557 A1* 8/2002  Ono .................. G02F 1/134363
                                                       349/193

(Continued)

FOREIGN PATENT DOCUMENTS

CN      101295090 A      10/2008
CN      103365014 A      10/2013
(Continued)

OTHER PUBLICATIONS

CN202110453800.9 first office action.
CN202110453800.9 Decision of Rejection.
PCT/CN2021/125547 international search report.

*Primary Examiner* — James A Dudek
(74) *Attorney, Agent, or Firm* — IPro, PLLC

(57) ABSTRACT

A display panel includes a first base substrate, a driving layer, a plurality of pixel electrodes, a common electrode, and a reflection layer. The driving layer is at a side of the first base substrate. The pixel electrodes are at a side of the driving layer away from the first base substrate and are electrically connected with the driving layer. The common electrode is at a side of the pixel electrodes away from the driving layer, is insulated from the pixel electrodes, and includes a plurality of openings for exposing the pixel electrodes. At least a partial region of the common electrode is opaque. The reflective layer is between the first base substrate and the driving layer and includes a plurality of openings for exposing the pixel electrodes.

16 Claims, 13 Drawing Sheets

(51) Int. Cl.
*G06F 3/01* (2006.01)
*G06T 19/00* (2011.01)

(56) References Cited

U.S. PATENT DOCUMENTS

| | | |
|---|---|---|
| 2006/0001814 A1 | 1/2006 | Paik et al. |
| 2008/0266497 A1 | 10/2008 | Chen |
| 2015/0028343 A1 | 1/2015 | Li |
| 2017/0123250 A1* | 5/2017 | Wada ................ H01L 29/78633 |
| 2019/0129238 A1 | 5/2019 | Wang et al. |
| 2019/0258124 A1 | 8/2019 | Morinaga et al. |
| 2021/0011571 A1 | 1/2021 | Zhang et al. |
| 2021/0191181 A1 | 6/2021 | Im et al. |

FOREIGN PATENT DOCUMENTS

| | | |
|---|---|---|
| CN | 205301759 U | 6/2016 |
| CN | 107632453 A | 1/2018 |
| CN | 109856870 A | 6/2019 |
| CN | 110174795 A | 8/2019 |
| CN | 110349976 A | 10/2019 |
| CN | 110752221 A | 2/2020 |
| CN | 111061079 A | 4/2020 |
| CN | 111948848 A | 11/2020 |
| CN | 111948858 A | 11/2020 |
| CN | 113156651 A | 7/2021 |

* cited by examiner

DISPLAY PANEL AND DISPLAY DEVICE

CROSS-REFERENCE TO RELATED APPLICATIONS

This application is a National Stage of International Application No. PCT/CN2021/125547, filed Oct. 22, 2021, which claims priority to Chinese Patent Application No. 202110453800.9, filed with the China National Intellectual Property Administration on Apr. 26, 2021 and entitled "Display Panel and Display Device", the content of which is hereby incorporated by reference in its entirety.

TECHNICAL FIELD

The present disclosure relates to the technical field of display, and in particular to a display panel and a display device.

BACKGROUND

With the continuous development of display technology, people's demand for display products is increasing. High resolution is the inevitable trend of the display product.

However, as the resolution of display product is getting higher and higher, the pixel size is getting smaller and smaller. Especially when it is applied to micro-display products, the reduction of the pixel pitch inevitably causes crosstalk between pixels. In order to solve the problem of pixel crosstalk, the current solution is to increase the width of the black matrix, to cover the position where the crosstalk is generated. However, the increase of the width of the black matrix may reduce the area of the opening region of the pixel, so that the overall brightness of the display product is decreased.

SUMMARY

In a first aspect, embodiments of the present disclosure provide a display panel, including:
  a first base substrate;
  a driving layer, located at a side of the first base substrate;
  a plurality of pixel electrodes, located at a side of the driving layer away from the first base substrate, each of the pixel electrodes is electrically connected with the driving layer;
  a common electrode, located at a side of the pixel electrodes away from the driving layer, where the common electrode is insulated from the pixel electrodes; the common electrode includes a plurality of openings for exposing the pixel electrodes, and at least a partial region of the common electrode is opaque;
  a reflection layer, located between the first base substrate and the driving layer; where the reflection layer includes a plurality of openings for exposing the pixel electrodes.

In some embodiments of the present disclosure, the common electrode includes:
  a transparent conductive layer, located at a side close to the pixel electrodes;
  a light shielding layer, located at a side of the transparent conductive layer away from the pixel electrodes;
  where each of the transparent conductive layer and the light shielding layer includes openings for exposing the pixel electrodes, an orthographic projection of the light shielding layer on the first base substrate is within a range of an orthographic projection of the transparent conductive layer on the first base substrate.

In some embodiments of the present disclosure, a width of the light shielding layer between two adjacent openings is smaller than a width of the transparent conductive layer between the two adjacent openings.

In some embodiments of the present disclosure, the width of the light shielding layer between two adjacent openings is 1.8 µm to 2.2 µm.

In some embodiments of the present disclosure, a material of the light shielding layer is metal molybdenum.

In some embodiments of the present disclosure, a width of the reflection layer between two adjacent openings is 1.8 µm to 2.3 µm.

In some embodiments of the present disclosure, the common electrode is made of a conductive light-shielding material.

In some embodiments of the present disclosure, a width of the common electrode between two adjacent openings is 2.8 µm to 3.4 µm.

In some embodiments of the present disclosure, a material of the common electrode is metal molybdenum.

In some embodiments of the present disclosure, a width of the reflection layer between two adjacent openings is 2.3 µm to 3.3 µm.

In some embodiments of the present disclosure, the driving layer includes:
  a plurality of scanning signal lines, extending in a first direction and arranged in a second direction, where the first direction intersects with the second direction;
  a plurality of data signal lines, extending in the second direction and arranged in the first direction; where the plurality of scanning signal lines and the plurality of data signal lines define a plurality of sub-pixel units, and the pixel electrodes correspond to the sub-pixel units one by one;
  a plurality of transistors, corresponding to the sub-pixel units one by one; where control electrodes of the transistors are electrically connected to corresponding scanning signal lines, first electrodes of the transistors are electrically connected to corresponding data signal lines, and second electrodes of the transistors are electrically connected to corresponding pixel electrodes;
the display panel further includes:
  an insulating layer, located between each of the pixel electrodes and the common electrode;
  a second base substrate, located at a side of the common electrode away from the pixel electrodes, where a distance between the second base substrate and the common electrode is a set distance;
  a color film layer, located at a side of the second base substrate facing the common electrode; where the color film layer includes a plurality of color film units corresponding to the sub-pixel units one by one and a black matrix for separating the color film units;
  a liquid crystal layer, located between the common electrode and the color film layer.

In some embodiments of the present disclosure, an orthogonal projection of the common electrode on the first base substrate and an orthogonal projection of the pixel electrode on the first base substrate have an overlapping region;
  an orthographic projection of the data signal line on the first base substrate and the orthographic projection of the pixel electrode on the first base substrate do not overlap with each other.

In some embodiments of the present disclosure, the orthographic projection of the data signal line on the first base substrate is within a range of an orthographic projection of the reflection layer on the first base substrate.

In a second aspect, embodiments of the present disclosure provide a display device, including a backlight module, and any above display panel located at a light emitting side of the backlight module.

In some embodiments of the present disclosure, the display device is a virtual reality display device or an augmented reality display device.

BRIEF DESCRIPTION OF FIGURES

In order to illustrate technical solutions in embodiments of the present disclosure more clearly, accompanying drawings that need to be used in describing embodiments of the present disclosure will be introduced below briefly. Obviously the accompanying drawings described below are only some embodiments of the present disclosure, and other accompanying drawings can also be obtained by those ordinary skilled in the art according to these accompanying drawings without creative labor.

DETAILED DESCRIPTION

Figure 1:
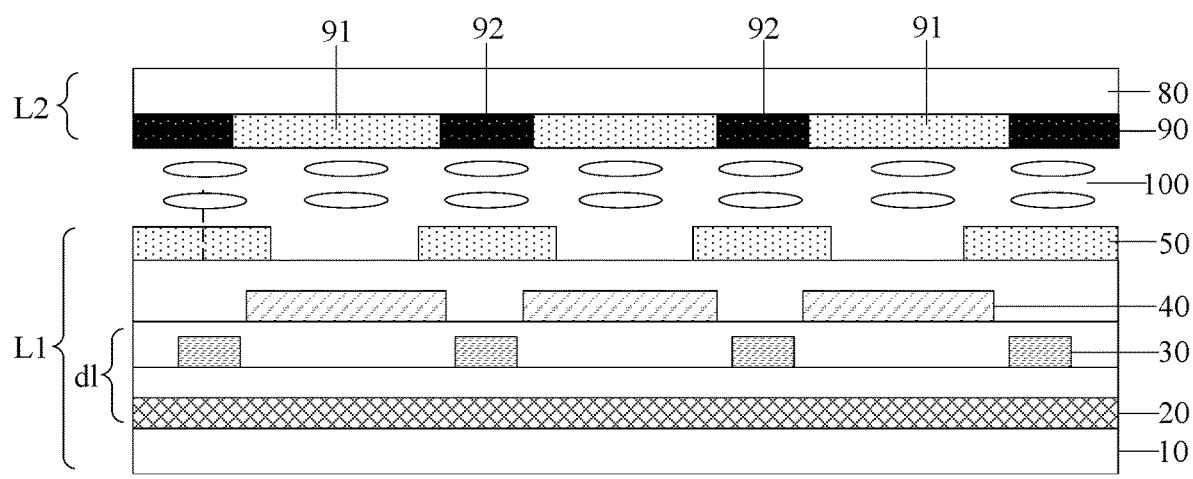
FIG. 1 is a schematic diagram of a cross-sectional structure of a display panel according to an embodiment of the present disclosure.

In order to make the above-mentioned objects, features and advantages of the present disclosure more apparent, the present disclosure will be further illustrated below in combination with the drawings and embodiments. However, embodiments can be implemented in various forms and should not be understood as being limited to embodiments illustrated here. On the contrary, these embodiments are provided to make the present disclosure more comprehensive and complete, and the concept of embodiments is fully conveyed to those skilled in the art. The same reference numbers represent the same or similar structures in the drawings, so the repeated description thereof will be omitted. The words expressing the positions and directions described in the present disclosure are all intended to illustrate by taking the drawings as examples, but can also be changed as needed, where the changes made are all contained in the protection scope of the present disclosure. The drawings of the present disclosure are merely intended to illustrate the relative position relationship, but not represent the real proportion.

Near-eye display is a hot research topic at present, can provide people with an unprecedented sense of interaction, and has important application value in many fields such as telemedicine, industrial design, education, military virtual training, and entertainment and so on.

With the rapid development of near-eye display technology, Virtual Reality (VR) and Augmented Reality (AR) have increasingly become an important way for human beings to obtain information, and also a new way for people to interact with the world. In the VR near-eye display technology, images for the left eye and the right eye are respectively displayed on a near-eye display corresponding to the left eye and the right eye, and stereo vision can be synthesized in the brain after the left and right eyes respectively acquire image information with differences. In the AR near-eye display technology, the virtual image generated by the near-eye display device and the real image of the real world are superimposed for display, so as to enable the user to see the final augmented reality image from the screen.

The near-eye display device typically takes the form of a helmet or glasses. The near-eye display device is provided with a micro display screen which is used with a transparent element and the like to realize image display. The micro display screen can adopt a liquid crystal display screen or an organic light-emitting diode display screen. Since the size of the display screen in the near-eye display device is small, the cost can be effectively reduced by using the liquid crystal display screen.

The liquid crystal display mainly includes a backlight module and a liquid crystal display panel. The liquid crystal display panel itself does not emit light, so it needs to rely on a light source provided by the backlight module to achieve brightness display.

The display principle of the liquid crystal display screen is that the liquid crystal is placed between two pieces of glass and driven by an electric field between two electrodes, causing the electric field effect of liquid crystal molecules to be twisted, so as to control transmission or shielding function of the backlight source, thereby displaying an image. If a color filter is added, a color image can be displayed.

The structure of the liquid crystal display panel in the near-eye display device is different from that of the liquid crystal display panel in a display device such as a mobile phone, a television, a computer and the like.

FIG. 1 is a schematic diagram of a cross-sectional structure of a display panel according to an embodiment of the present disclosure.

As shown in FIG. 1, the display panel includes an array substrate L1 and a color filter substrate L2. A liquid crystal layer 100 is further included between the array substrate L1 and the color filter substrate L2.

The array substrate L1 includes a first base substrate 10, and the color filter substrate L2 includes a second base substrate 80. The first base substrate 10 and the second base substrate 80 are disposed opposite to each other. A structure that the liquid crystal layer 100 is sandwiched between the first base substrate 10 and the second base substrate 80 is formed.

A color film layer 90, as shown in FIG. 1, is further provided on a surface of the second base substrate 80 of the color filter substrate L2 facing the first base substrate 10, The color film layer 90 includes a plurality of color film units 91 corresponding to sub-pixel units one by one and black matrix 92 separating the color film units 91.

Figure 2:
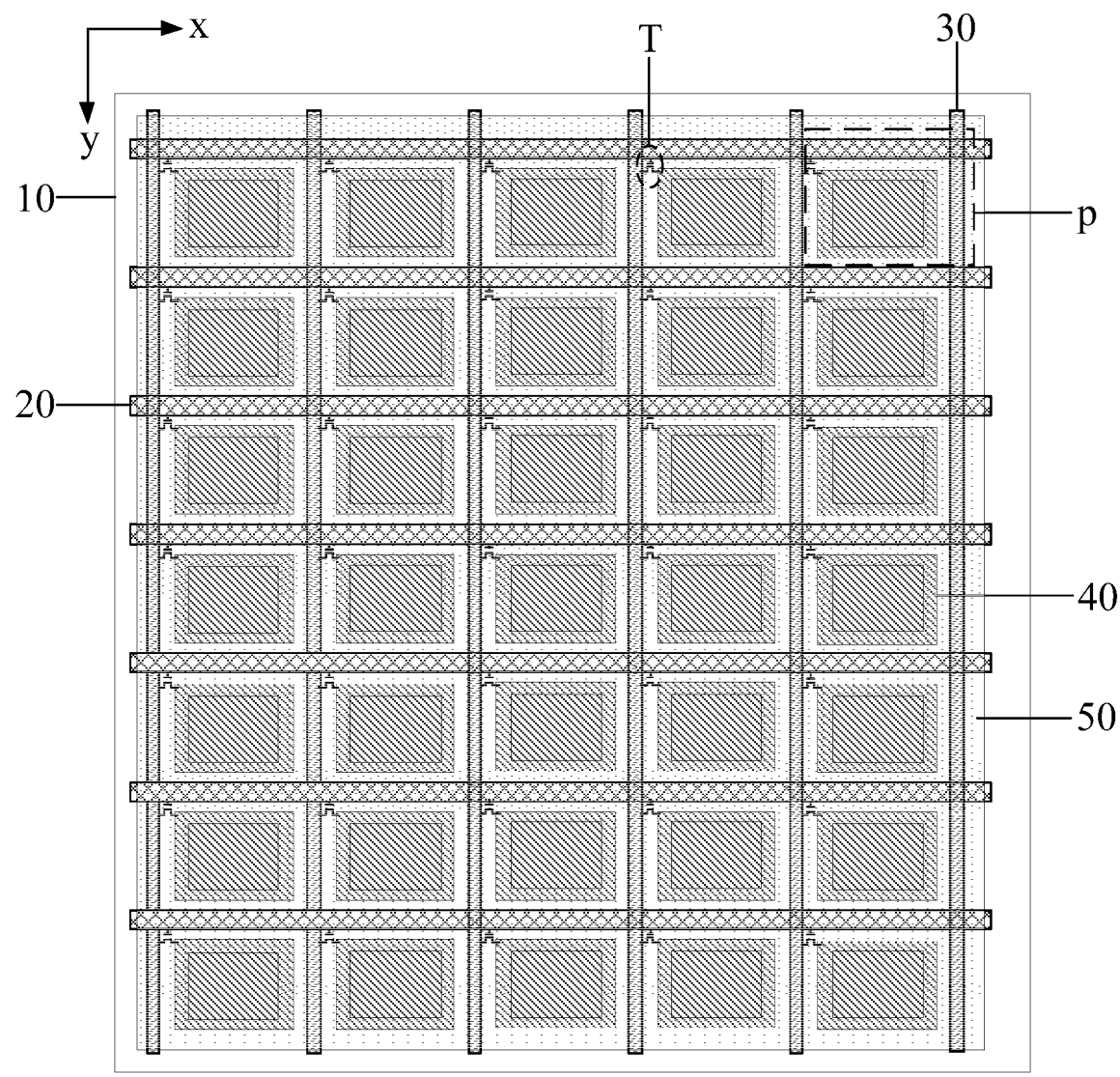
FIG. 2 is a first schematic diagram of a planar structure of a display panel according to an embodiment of the present disclosure.
Figure 3:
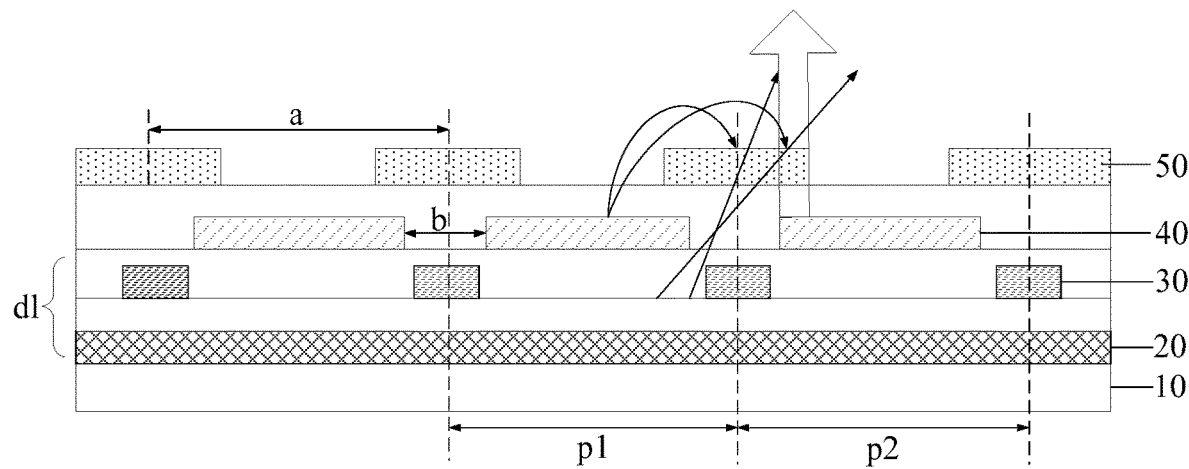
FIG. 3 is a schematic diagram of a cross-sectional structure of the display panel corresponding to FIG. 2.

FIG. 2 is a first schematic diagram of a planar structure of a display panel according to an embodiment of the present disclosure. FIG. 3 is a schematic diagram of a cross-sectional structure of the display panel corresponding to FIG. 2.

FIG. 2 and FIG. 3 show the structure of the array substrate in the display panel. As shown in FIG. 2 and FIG. 3, the display panel includes a first base substrate 10, where the first base substrate 10 is located at the bottom and has functions of supporting and bearing. The first base substrate 10 may be generally made of glass.

A driving layer dl is located on the base substrate 10. The driving layer dl generally includes a plurality of film layers, and the plurality of film layers may be sequentially formed on the first base substrate 10 using a thin film process. The driving layer dl includes signal lines, transistors, capacitors, resistors, and other components for transmitting driving signals.

As shown in FIG. 2 and FIG. 3, the driving layer dl includes a plurality of scanning signal lines 20, a plurality of data signal lines 30, and a plurality of transistors T.

The plurality of scanning signal lines 20 extend in a first direction x and are arranged in a second direction y. The first direction x intersects with the second direction y. In some embodiments, the first direction x may be a direction of a row of sub-pixel units, the second direction y may be a direction of a column of sub-pixel units, and the first direction x and the second direction y are perpendicular to each other.

The plurality of data signal lines 30 extend in the second direction y and are arranged in the first direction x. The plurality of scanning signal lines 20 and the plurality of data signal lines 30 divide a plurality of sub-pixel units p.

The plurality of transistors T correspond to the sub-pixel units p one by one. Control electrodes of the transistors are electrically connected to corresponding scanning signal lines 20, first electrodes of the transistors are electrically connected to corresponding data signal lines 30, second electrodes of the transistors are electrically connected to corresponding pixel electrodes.

The transistors T are used as active driving elements and correspond to sub-pixel units p one by one. One sub-pixel unit p is provided with one transistor T. The transistor T loads a data signal transmitted by the connected data signal line 30 to the pixel electrode of the corresponding sub-pixel unit p under control of the scan signal transmitted by the connected scanning signal line 20 so as to control brightness of the sub-pixel unit p.

As shown in FIG. 2 and FIG. 3, the display panel further includes a plurality of pixel electrodes 40 and a common electrode 50.

The pixel electrodes 40 correspond to the sub-pixel units p one by one, and one sub-pixel unit p is provided with one pixel electrode 40.

A plurality of pixel electrodes 40 are located at a side of the driving layer dl away from the first base substrate 10. The pixel electrodes 40 are electrically connected to the second electrodes of the transistors in the driving layer dl.

In the display panel according to embodiments of the present disclosure, both the pixel electrodes 40 and the common electrode 50 are located at a same side of the array substrate, and an insulating layer is further provided between the pixel electrodes 40 and the common electrode 50 for insulating the pixel electrodes 40 from the common electrode 50.

The common electrode 50 is located at a side of the pixel electrodes 40 away from the driving layer dl. The common electrode 50 includes a plurality of openings for exposing the pixel electrodes 40.

After an electrical signal is applied to the pixel electrodes 40 and the common electrode 50, an electric field line extends from the pixel electrodes 40 to the openings of the common electrode 50 and then points to the common electrode 50, forming a horizontal electric field to drive liquid crystal molecules to turn over, so as to adjust transmittance of the liquid crystal layer corresponding to the respective sub-pixel units, achieving brightness adjustment of the sub-pixel units.

As shown in FIG. 2 and FIG. 3, an orthographic projection of the common electrode 50 on the first base substrate 10 and orthographic projections of the pixel electrodes 40 on the first base substrate 10 have an overlapping region, and a capacitance that may be generated by the overlapping region is a storage capacitance of the sub-pixel units p.

Orthographic projections of the data signal lines 30 on the first base substrate and the orthographic projections of the pixel electrodes on the first base substrate do not overlap with each other.

As shown in FIG. 3, when the structure of the display panel according to embodiments of the present disclosure is adopted, a width of the sub-pixel unit is greater than a width of the pixel electrode 40. Generally, the width of the sub-pixel unit further includes half of a width of the common electrode 50 at both sides of the pixel electrode 40, that is, the width of the sub-pixel unit is 'a' shown in FIG. 3, and spacing between two pixel electrodes 40 is b. For a high-resolution display panel, taking a display panel of 1500 PPI as an example, the width 'a' of the sub-pixel unit is generally less than 6 μm, and the spacing b between the two pixel electrodes 40 is less than 4 μm. Under this size setting, the electric field between the pixel electrode and the common electrode in one sub-pixel unit is not exactly divided by the center line of the common electrode, and electric fields of adjacent sub-pixel units may cross-talk with each other. As shown in FIG. 3, two adjacent sub-pixel units are a first sub-pixel unit p1 and a second sub-pixel unit p2, respectively. If the first sub-pixel unit p1 is in a bright state and the second sub-pixel unit p2 is in a dark state, in principle, only the first sub-pixel unit p1 has an electric field, and the second sub-pixel unit p2 has no electric field. Because the spacing between the pixel electrodes 40 is small, an electric field line of the first sub-pixel unit p1 may cross the center line of the common electrode, acting on the common electrode 50 in the second sub-pixel unit p2, and an electric field is also generated in an edge region of the second sub-pixel unit p2. This may cause the second sub-pixel unit p2 to have brightness, resulting in crosstalk between the sub-pixel units. In order to avoid the crosstalk, a width of the black matrix 92 on the color filter substrate L2 in FIG. 1 needs to be increased. However, the increase of the width of the black matrix 72 may cause reduction of the aperture ratio of the sub-pixel unit, and the brightness requirement cannot be met.

In addition, as shown in FIG. 3, the large light-emitting angle of the sub-pixel unit may also cause the color crosstalk problem. This is because colors of adjacent sub-pixel units are generally different. The large-angle light emitted from the first sub-pixel unit p1 is incident into a corresponding region in the second sub-pixel unit p2, and then passes through the color film unit of the second sub-pixel unit p2. Sub-pixel units of two colors have brightness, causing the problem of large-angle color crosstalk.

In order to solve the above technical problem, embodiments of the present disclosure provide a display panel, in which at least a partial region of the common electrode 50 is opaque. In such a case, a boundary position of adjacent sub-pixel units can be effectively shielded, a region generating the electric field crosstalk is located in the opaque region of the common electrode, so that the emergence of crosstalk light can be blocked, solving the problem of light crosstalk. As for the large-angle light emitted by the sub-pixel unit, the opaque region of the common electrode can also shield the large-angle light, so as to solve the problem of large visual angle color crosstalk.

However, since at least a partial region of the common electrode 50 is opaque, light cannot be emitted out of the opaque region, transmittance of the display panel is lost and brightness is decreased. In order to alleviate the above problem, the present disclosure further provides a reflection layer between the first base substrate 10 and the driving layer dl, and the reflection layer includes a plurality of openings for exposing respective pixel electrodes 40. In such a case, light emitted from the backlight module can be smoothly emitted to regions of the pixel electrodes 40. Light emitted from the backlight module can be effectively reflected after being emitted to the reflection layer, and the reflected light enters the backlight module again, after being reflected by a reflective structure such as a reflective sheet in the backlight module, the light can be emitted to the display panel again, and a part of the light can further be emitted to regions of the pixel electrodes 40. Through the cyclic reflection effect between the reflection layer and the reflective film in the backlight module, the emergent efficiency of light can be effectively improved, and transmittance of the display panel is ensured not to be lost.

In implementations, orthographic projections of the data signal lines 30 on the first base substrate 10 is within a range of an orthographic projection of the reflection layer on the first base substrate 10. Because both the scanning signal line 20 and the data signal line 30 are opaque, light emitted from the backlight module is shielded by the scanning signal line 20, the data signal line 30, and other signal lines. The reflection layer is provided between the first base substrate 10 and the driving layer dl, and the reflection layer has a high reflectivity, so that the pattern of the reflection layer can cover patterns of the scanning signal lines 20 and the data signal lines. Therefore, light emitted from the backlight module to the reflection layer can be effectively reflected without being completely lost.

The reflection layer in embodiments of the present disclosure may be made of metal materials such as aluminum or silver. These metal materials have high reflectivity, and generally the reflection layer with a thickness of less than 1 µm has a better reflection effect. Therefore, the final light emitting efficiency of the display panel can be effectively improved.

The larger the width of the opaque region of the common electrode is, the smaller the size of the opening region of the sub-pixel unit is, and the lower the transmittance of light is. However, the provision of the reflection layer 70 may in turn increase the light intensity in the opening region, and the final gain and transmittance of the display panel are influenced by the width of the opaque region of the common electrode and the width of the reflection layer 70.

In order to set the widths of the opaque region of the common electrode and the reflection layer 70 to a suitable range, so that the display panel has better gain and transmittance, in embodiments of the present disclosure, the display panel of 1500 PPI is taken as an example, and a simulation test is performed on relevant parameters of the display panel. The spacing between sub-pixel units p is 5.8 µm, and the width of the data signal line 30 is 1.8 µm.

Figure 4:
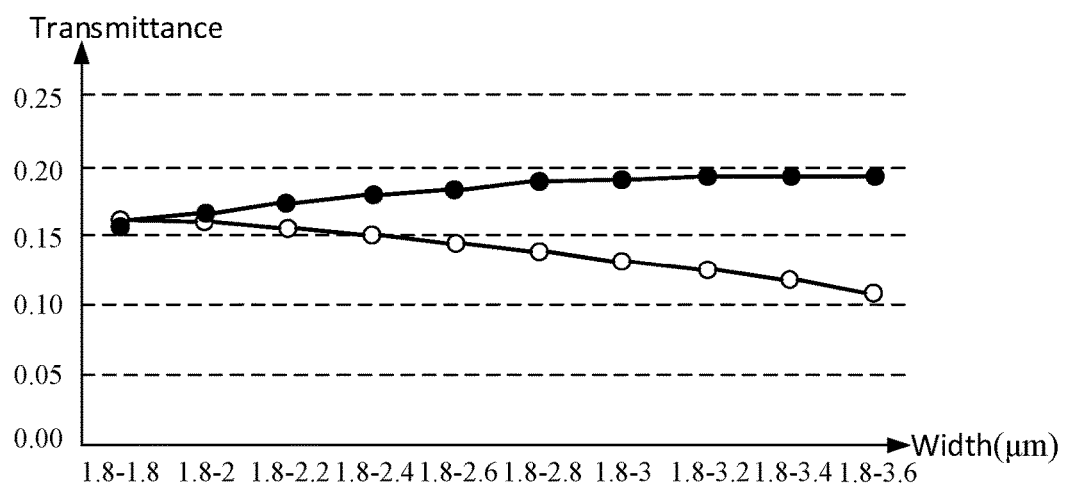
FIG. 4 is a diagram of transmittance curves under a condition that a common electrode is fully transparent and a condition that at least part of the common electrode is opaque according to an embodiment of the present disclosure.

FIG. 4 is a diagram of transmittance curves corresponding to a condition that a common electrode is fully transparent and a condition that at least part of the common electrode is opaque according to an embodiment of the present disclosure. As shown in FIG. 4, the curve connected by black dots is the transmittance curve of the common electrode with different widths corresponding to the condition that the common electrode is fully transparent. The curve connected by white dots is the transmittance curve of the common electrode with different widths corresponding to the condition that at least a partial region of the common electrode is opaque. The number in front of "-" in the abscissa represents the width of the data signal line, and the number following the "-" represents the width of the common electrode or the width of the opaque region of the common electrode.

By comparing the two curves in FIG. 4, it can be seen that when only the transparent common electrode is used in the display panel, that is, when the whole region of the common electrode is transparent, the transmittance increases with the increase of the width of the common electrode. When at least a partial region of the common electrode in the display panel is opaque, the transmittance of the display panel decreases with the increase of the width of the opaque region.

Figure 5:
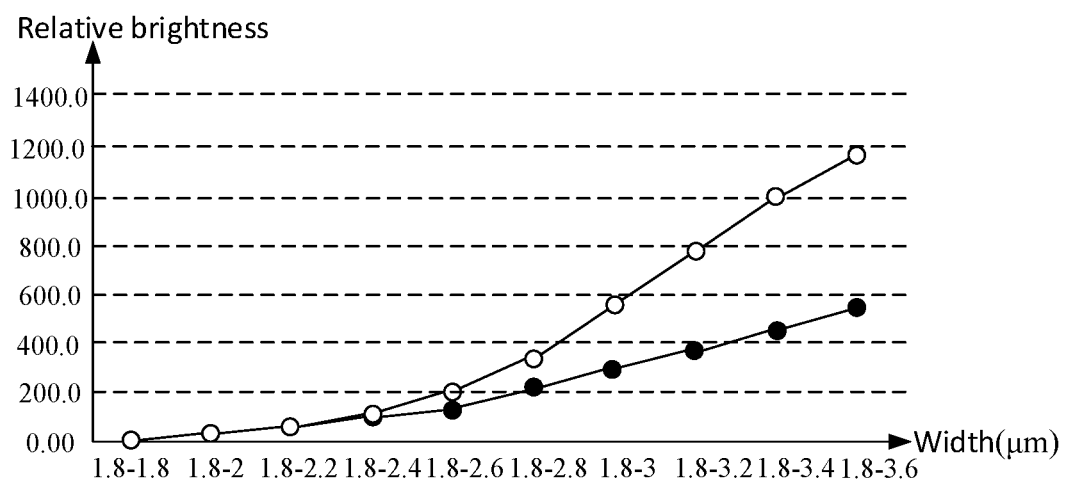
FIG. 5 is a diagram of relative brightness curves under a condition that a common electrode is fully transparent and a condition that at least part of the common electrode is opaque according to an embodiment of the present disclosure.

FIG. 5 is a diagram of relative brightness curves corresponding to a condition that a common electrode is fully transparent and a condition that at least part of the common electrode is opaque according to an embodiment of the present disclosure. As shown in FIG. 5, the curve connected by black dots is the relative brightness curve of the common electrode with different widths corresponding to the condition that the common electrode is fully transparent. The curve connected by white dots is the relative brightness curve of the common electrode with different widths corresponding to the condition that at least a partial region of the common electrode is opaque. The number in front of "-" in the abscissa represents the width of the data signal line, and the number following the "-" represents the width of the common electrode or the width of the opaque region of the common electrode.

A ratio of target brightness to crosstalk brightness may reflect the degree of crosstalk between sub-pixel units. The larger the ratio of the target brightness to the crosstalk brightness is, indicating that the larger the target brightness is and the smaller the crosstalk brightness is, then the smaller the crosstalk degree is, and the purer the color of the sub-pixel unit is. Conversely, the smaller the ratio of the target brightness to the crosstalk brightness is, indicating that the smaller the target brightness is and the larger the crosstalk brightness is, then the lager the crosstalk degree is.

By comparing the two curves in FIG. 5, it can be seen that when only the transparent common electrode is used in the display panel, that is, when the whole region of the common electrode is transparent, the relative brightness increases with the increase of the width of the common electrode. When at least a partial region of the common electrode in the display panel is opaque, the relative brightness of the display panel increases to a greater extent with the increase of the width of the opaque region. It can be explained that when the opaque region is provided in the common electrode, as the width of the opaque region increases, the degree of crosstalk between the sub-pixel units is smaller.

Figure 6:
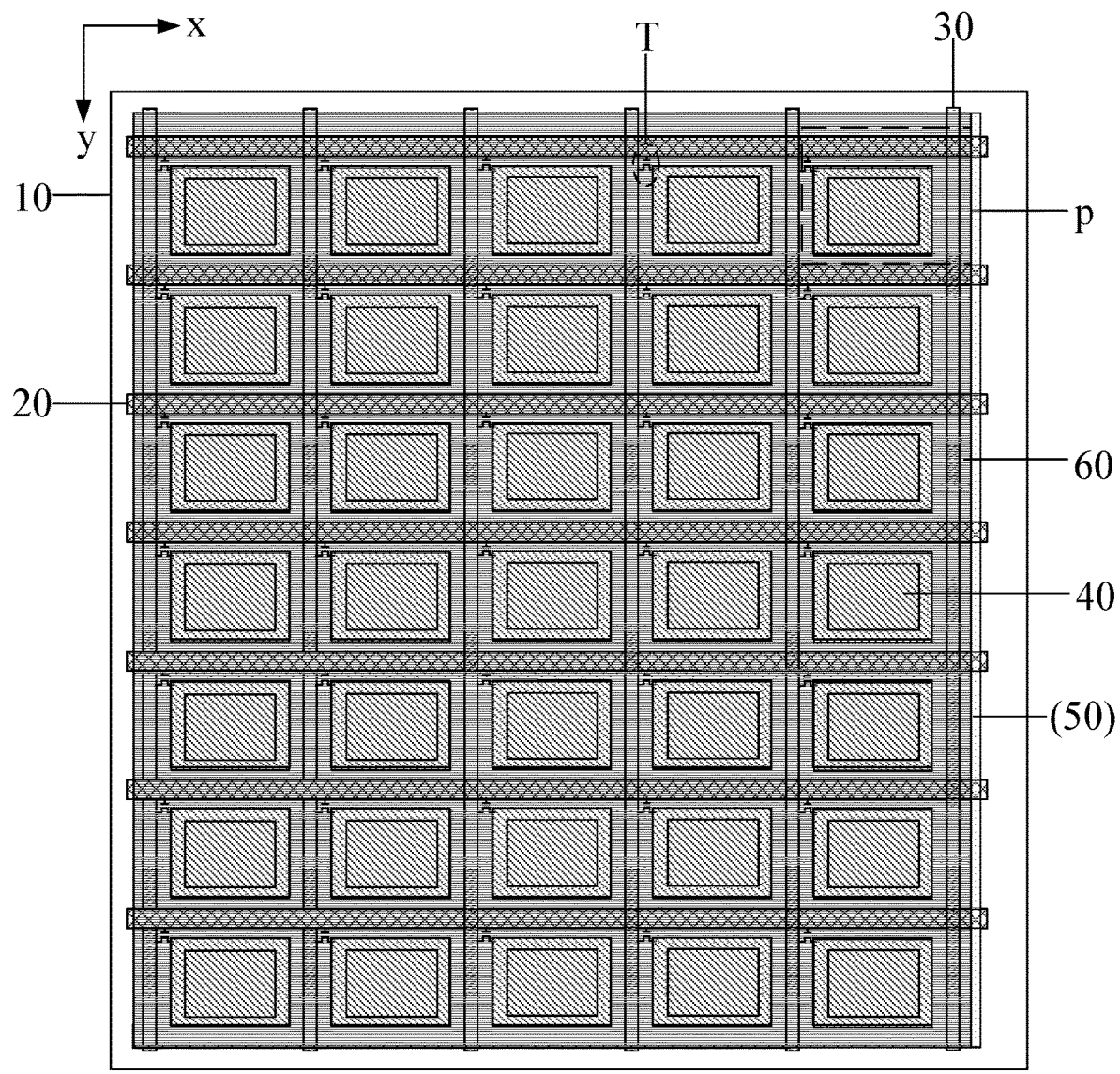
FIG. 6 is a second schematic diagram of a planar structure of a display panel according to an embodiment of the present disclosure.
Figure 7:
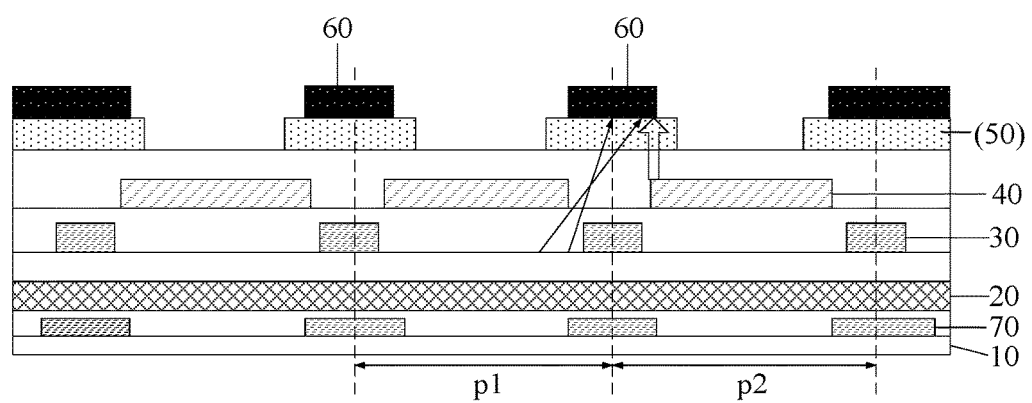
FIG. 7 is a schematic diagram of a cross-sectional structure of the display panel corresponding to FIG. 6.

FIG. 6 is a second schematic diagram of a planar structure of a display panel according to an embodiment of the present disclosure. FIG. 7 is a schematic diagram of a cross-sectional structure of the display panel corresponding to FIG. 6.

In some embodiments, as shown in FIG. 6 and FIG. 7, the common electrode includes a transparent conductive layer (50) and a light shielding layer 60. The display panel further includes a reflection layer 70.

The transparent conductive layer (50) is located at a side close to the pixel electrodes 40. The transparent conductive layer can be made of a transparent conductive material, such as indium tin oxide (ITO), which is not limited herein.

The light shielding layer 60 is located at a side of the transparent conductive layer (50) away from the pixel electrodes 40. In order to adapt to the current manufacturing process of the display panel, the light shielding layer 60 can be made of metal molybdenum. The metal molybdenum is a material adopted for a metal layer in the display panel, and the light shielding effect of the metal molybdenum is better. The light shielding layer 60 is made of a metal material, and the light shielding layer 60 is in contact with the transparent conductive layer (50), so that the resistance of the common electrode can be reduced. In addition, the light shielding layer 60 may be made of other light shielding materials, which is not limited herein.

As shown in FIG. 6 and FIG. 7, each of the transparent conductive layer (50) and the light shielding layer 60 includes openings for exposing respective pixel electrodes 40. An orthographic projection of the light shielding layer 60 on the first base substrate 10 is within a range of an orthographic projection of the transparent conductive layer (50) on the first base substrate 10.

The function of the light shielding layer 60 is to shield a crosstalk region between adjacent sub-pixel units, and shield the large-angle light emitted from the sub-pixel unit. However, if the size of the light shielding layer 60 is too large, the aperture ratio of the sub-pixel unit is reduced, therefore, the size of the light shielding layer 60 in the present disclosure does not exceed the size of the transparent conductive layer (50).

As shown in FIG. 6 and FIG. 7, a width of the light shielding layer 60 between two adjacent openings is smaller than a width of the transparent conductive layer (50) between two adjacent openings.

Because the width of the light shielding layer 60 and the width of the reflection layer 70 together affect the brightness gain and transmittance of the display panel, in embodiments of the present disclosure, relevant parameters of the display panel under different widths of the light shielding layer 60 and the reflection layer 70 are simulated and tested.

Figure 8:
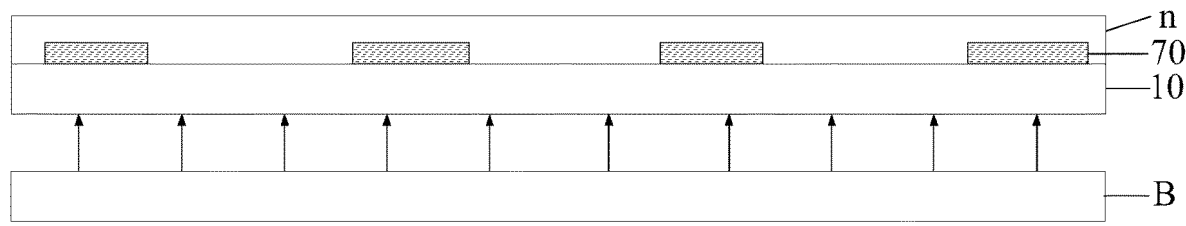
FIG. 8 is a simplified structural diagram of a display panel according to an embodiment of the present disclosure.

FIG. 8 is a simplified structural diagram of a display panel according to an embodiment of the present disclosure.

As shown in FIG. 8, a plurality of components in the display panel with the same structure are removed, and only the backlight module B, the first base substrate 10, the reflection layer 70, and the insulating layer n remain. The present disclosure varies the width of the reflection layer 70 between two openings, the gain of the display device under different widths of the reflection layer 70 is simulated, and the simulation result is shown in FIG. 9.

Figure 9:
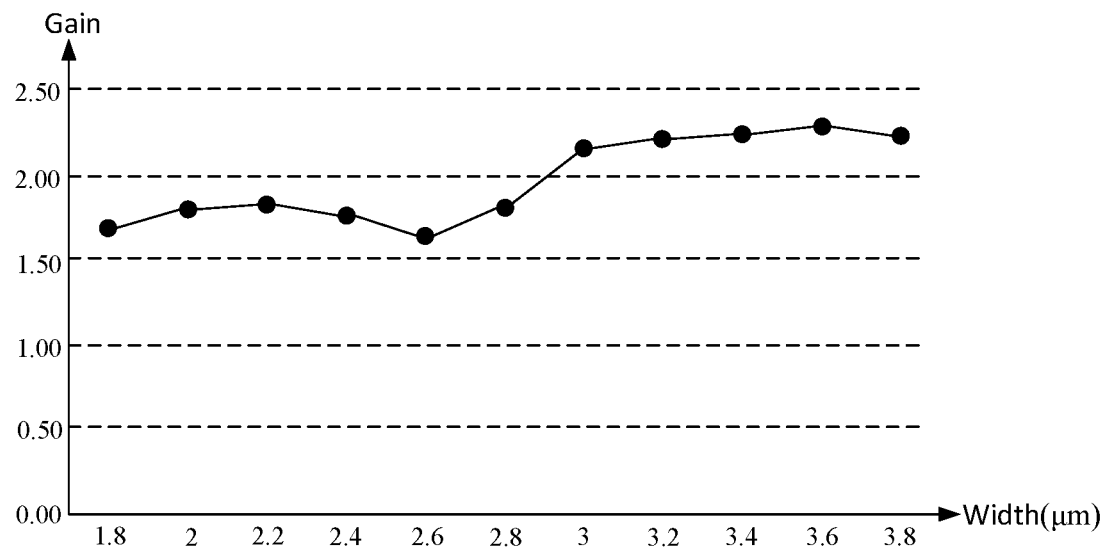
FIG. 9 is a first curve showing a corresponding relationship between a width of a reflection layer and brightness gain according to an embodiment of the present disclosure.

As shown in FIG. 9, the abscissa indicates the width of the reflection layer 70, and the ordinate indicates the brightness gain of the display device. It can be seen that as the width of the reflection layer 70 increases, the brightness gain of the display panel increases. That is to say, the increase in the width of the reflection layer 70 is beneficial to improving the light emitting efficiency of the display panel and improving the brightness of the sub-pixel units.

However, in implementations, a light shielding layer 60 is further disposed above the transparent conductive layer (50), and the larger the width of the light shielding layer 60 is, the smaller the opening region of the sub-pixel unit is, and the transmittance of the sub-pixel unit is reduced.

In an embodiment of the present disclosure, when the width of the transparent conductive layer (50) is 3.4 μm and the width of the pixel electrode is 3 μm, transmittance of the display panel corresponding to different widths of the reflection layer and the light shielding layer is simulated.

Figure 10:
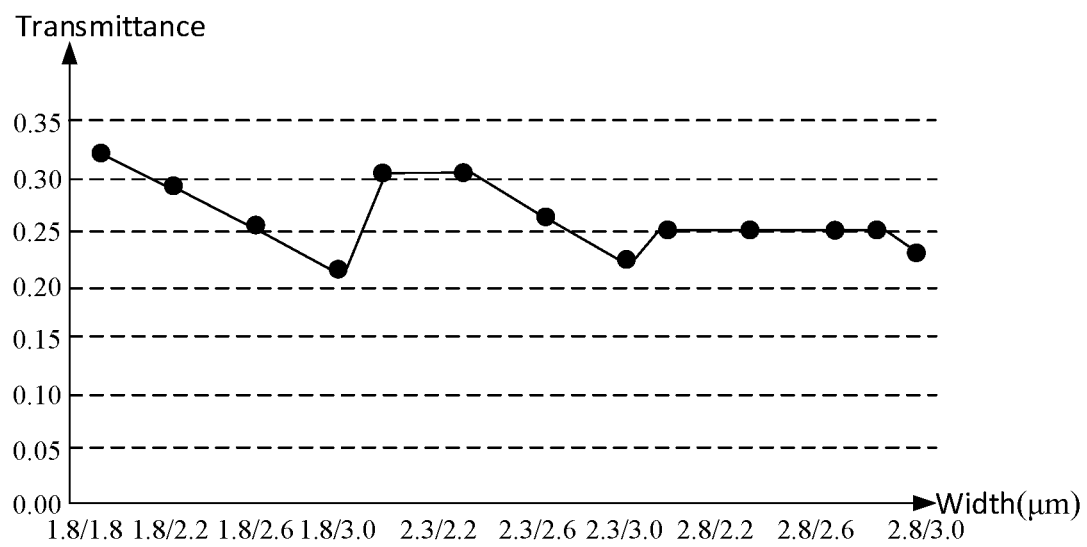
FIG. 10 is a curve showing a relationship between widths of a light shielding layer and a reflection layer and transmittance according to an embodiment of the present disclosure.

FIG. 10 is a curve showing a relationship between widths of a light shielding layer and a reflection layer and transmittance according to an embodiment of the present disclosure. The number in front of "/" in the abscissa represents the width of the reflection layer, and the number following "/" represents the width of the light shielding layer.

As shown in FIG. 10, since the width of the data signal line is 1.8 μm, when the widths of the reflection layer and the light shielding layer are both 1.8 μm, there is no loss in transmittance. The transmittance decreases as the width of the light shielding layer increases, and the gain increases as the width of the reflection layer increases. Collocation results of the reflection layer and the light shielding layer are as shown in FIG. 10, when the width of the reflection layer 70 between two adjacent openings is 1.8 μm to 2.3 μm, and the width of the light shielding layer 60 between two adjacent openings is 1.8 μm to 2.2 μm, the transmittance of the display panel is better, meeting requirements of practical application.

Figure 11:
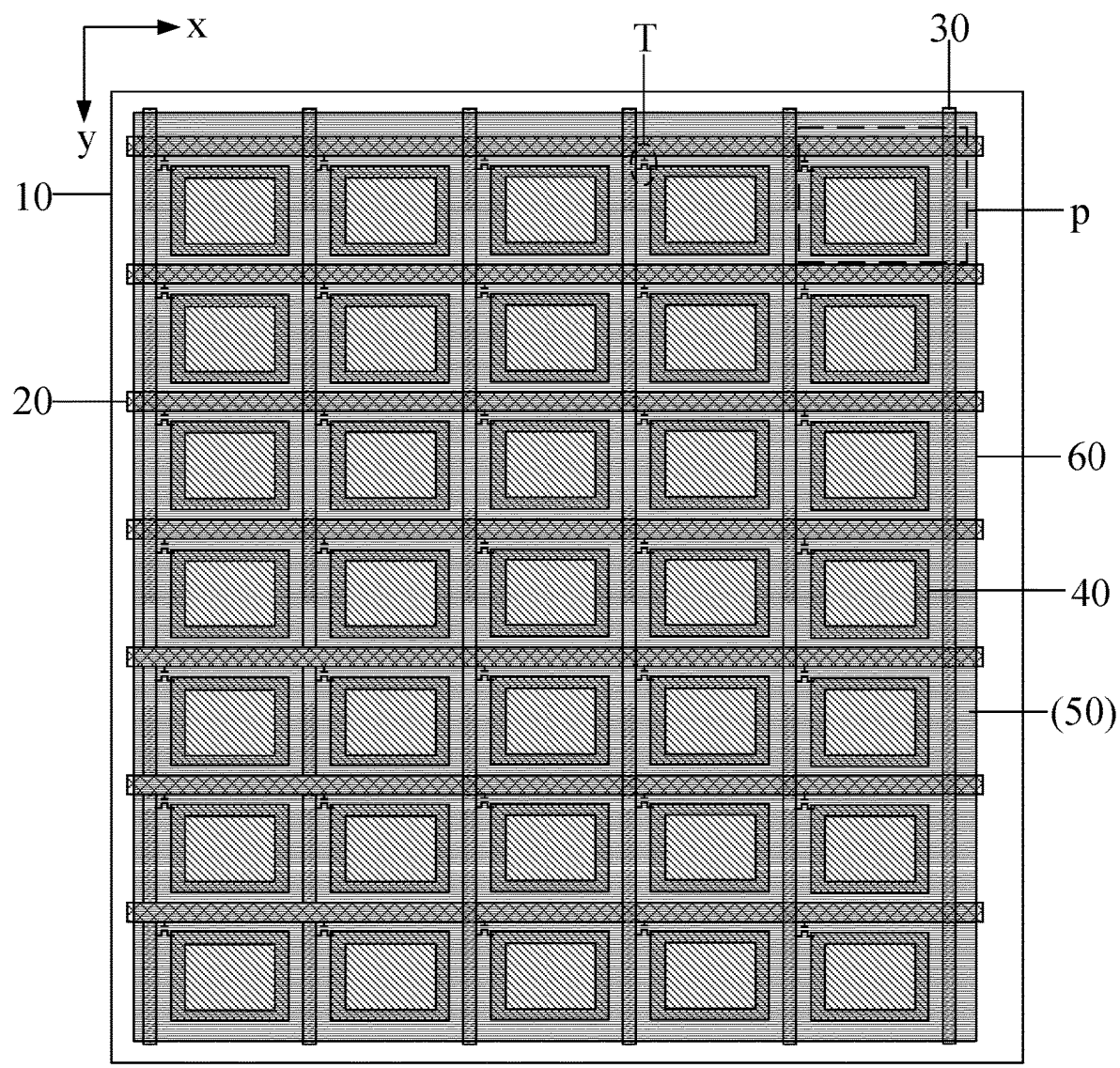
FIG. 11 is a third schematic diagram of a planar structure of a display panel according to an embodiment of the present disclosure.
Figure 12:
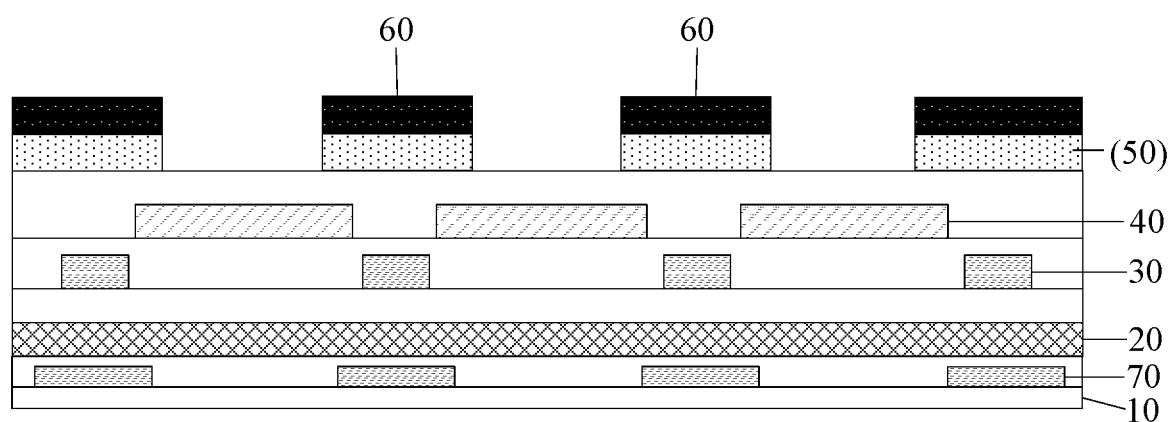
FIG. 12 is a schematic diagram of a cross-sectional structure of the display panel corresponding to FIG. 11.

FIG. 11 is a third schematic diagram of a planar structure of a display panel according to an embodiment of the present disclosure. FIG. 12 is a schematic diagram of a cross-sectional structure of the display panel corresponding to FIG. 11.

In some embodiments, as shown in FIG. 11 and FIG. 12, in order to maximally alleviate the crosstalk problem between sub-pixel units, the pattern of the light shielding layer 60 may be set to be identical with the pattern of the transparent conductive layer (50). In this case, the width of the transparent conductive layer (50) between two adjacent openings is equal to the width of the light shielding layer 60 between two adjacent openings.

When the above structure is adopted, the patterns of the transparent conductive layer (50) and the light shielding layer (60) are completely the same, but two patterning of two different conductive layers is required to obtain the above structure. In order to simplify the process and reduce the thickness of the film layer, the common electrode 50 can also be directly made of a conductive light-shielding material. Therefore, the arrangement of the light shielding layer 60 is omitted, and the same effect is achieved.

In implementations, the common electrode 50 may be made of metal molybdenum, and the metal molybdenum is the material of the metal layer in the display panel. Therefore, the common electrode is made of metal molybdenum and can be directly applied to the process line of the display panel. Of course, in addition, the common electrode 50 may be made of other conductive light-shielding materials, which is not limited herein.

Figure 13:
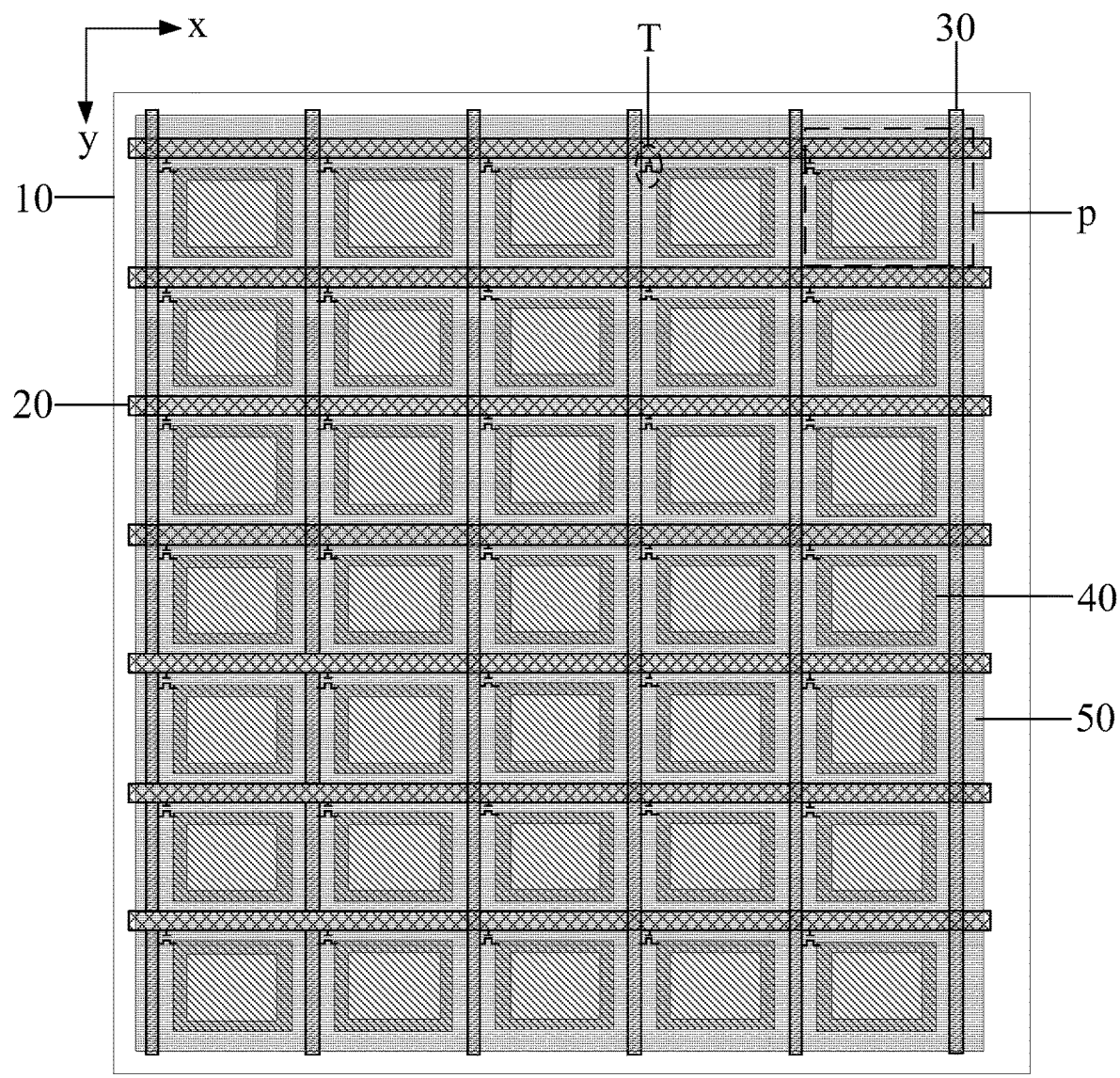
FIG. 13 is a fourth schematic diagram of a planar structure of a display panel according to an embodiment of the present disclosure.
Figure 14:
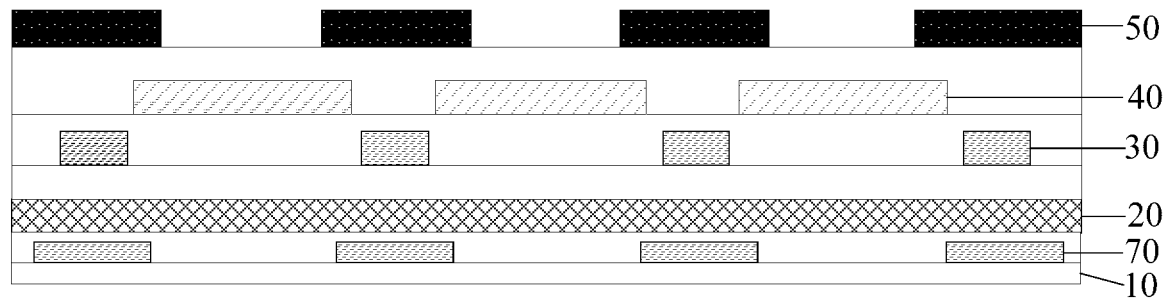
FIG. 14 is a schematic diagram of a cross-sectional structure of the display panel corresponding to FIG. 13.

FIG. 13 is a fourth schematic diagram of a planar structure of a display panel according to an embodiment of the present disclosure. FIG. 14 is a schematic diagram of a cross-sectional structure of the display panel corresponding to FIG. 13.

As shown in FIG. 13 and FIG. 14, the common electrode 50 is made of a conductive light-shielding material, shielding the crosstalk region between adjacent sub-pixel units and shielding the large-angle light emitted by the sub-pixel units, so as to solve the problem of crosstalk between the sub-pixel units. Further, a reflection layer 70 is arranged on the first base substrate 10, and the light emitting brightness of the opening region of the sub-pixel unit can be improved by using the cyclic reflection effect between the reflection layer 70 and elements in the backlight module.

Similarly, brightness gain and transmittance of the display panel under different widths of the common electrode 50 and the reflection layer 70 are simulated and tested according to an embodiment of the present disclosure.

Figure 15:
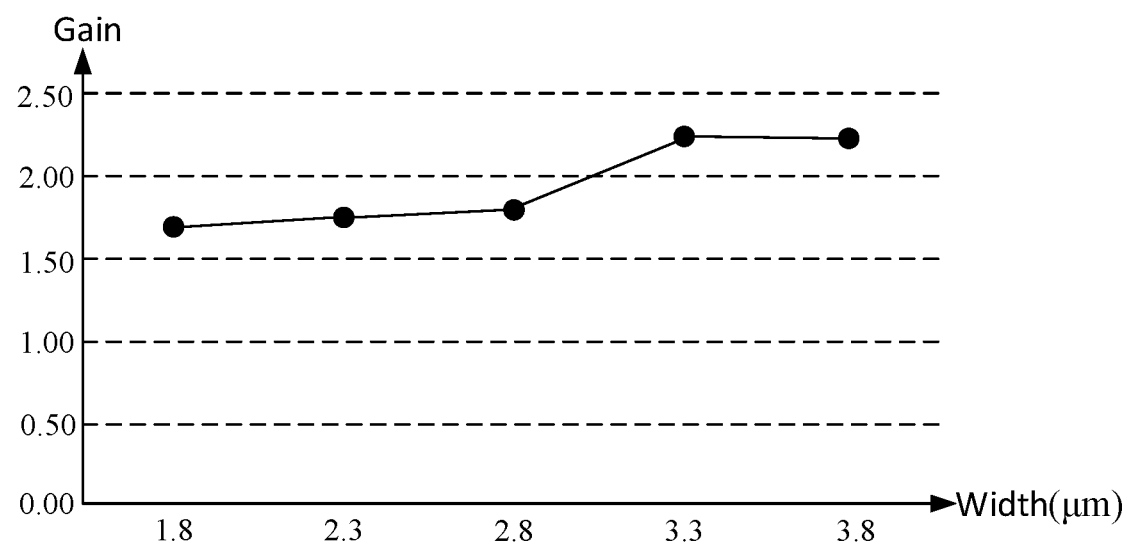
FIG. 15 is a second curve showing a corresponding relationship between a width of a reflection layer and brightness gain according to an embodiment of the present disclosure.

FIG. 15 is a curve showing a corresponding relationship between a width of a reflection layer and brightness gain according to an embodiment of the present disclosure. The abscissa represents the width of the reflection layer and the ordinate represents the brightness gain of the display panel.

As can be seen from FIG. 15, as the width of the reflection layer 70 increases, the brightness gain of the display panel increases, that is to say, the increase in the width of the reflection layer 70 is beneficial to improving the light emitting efficiency of the display panel and improving the brightness of the sub-pixel units.

Figure 16:
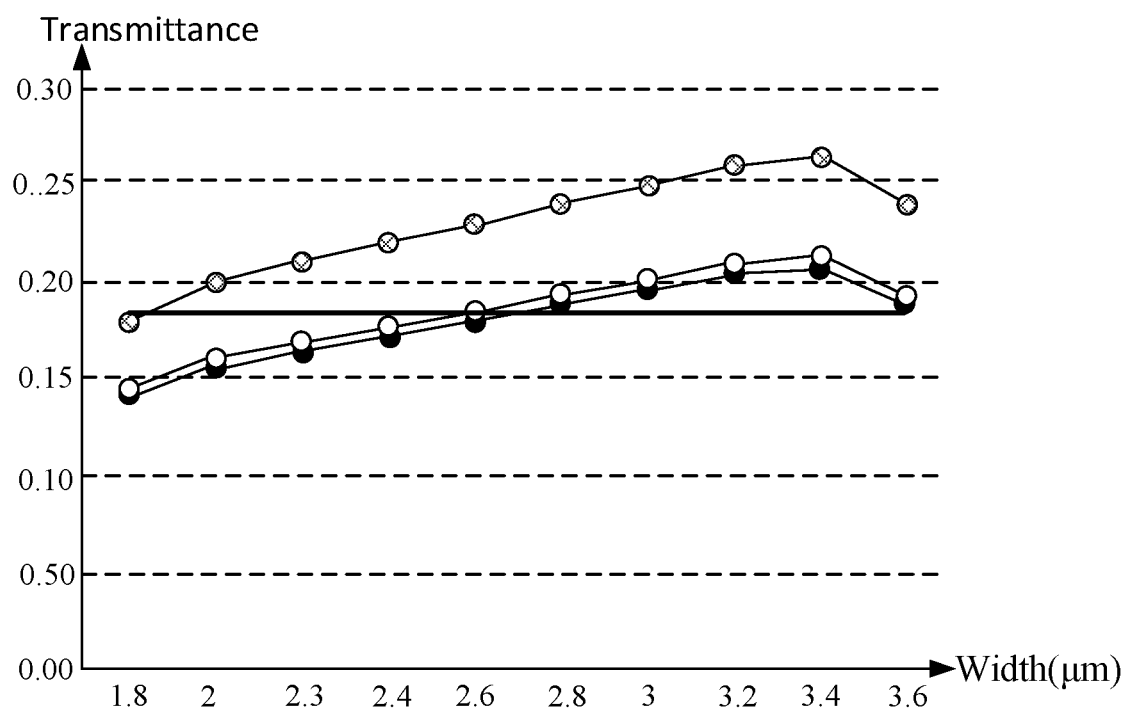
FIG. 16 is a diagram of transmittance curves corresponding to different widths of a common electrode according to an embodiment of the present disclosure.

FIG. 16 is a diagram of transmittance curves corresponding to different widths of a common electrode according to an embodiment of the present disclosure. The black line in FIG. 16 indicates a transmittance level of the display panel when the common electrode is made of a transparent conductive material and the reflection layer 70 is not provided. The curve connected by black dots represents a transmittance curve corresponding to the common electrode with different widths when the width of the reflection layer is 2.3 µm. The curve connected by white dots represents a transmittance curve corresponding to the common electrode with different widths when the width of the reflection layer is 2.8 µm. The curve connected by grid dots represents a transmittance curve corresponding to the common electrode with different widths when the width of the reflection layer is 3.3 µm.

As shown in FIG. 16, for the purpose of improving the transmittance, when the width of the reflection layer is set to be not less than 2.3 µm, the transmittance of the display panel can be improved. According to the test structure, when the width of the reflection layer between two adjacent openings is 2.3 µm to 3.3 µm, and the width of the common electrode between two adjacent openings is 2.8 µm to 3.4 µm, the transmittance of the display panel is better, meeting requirements of practical application.

Figure 17:
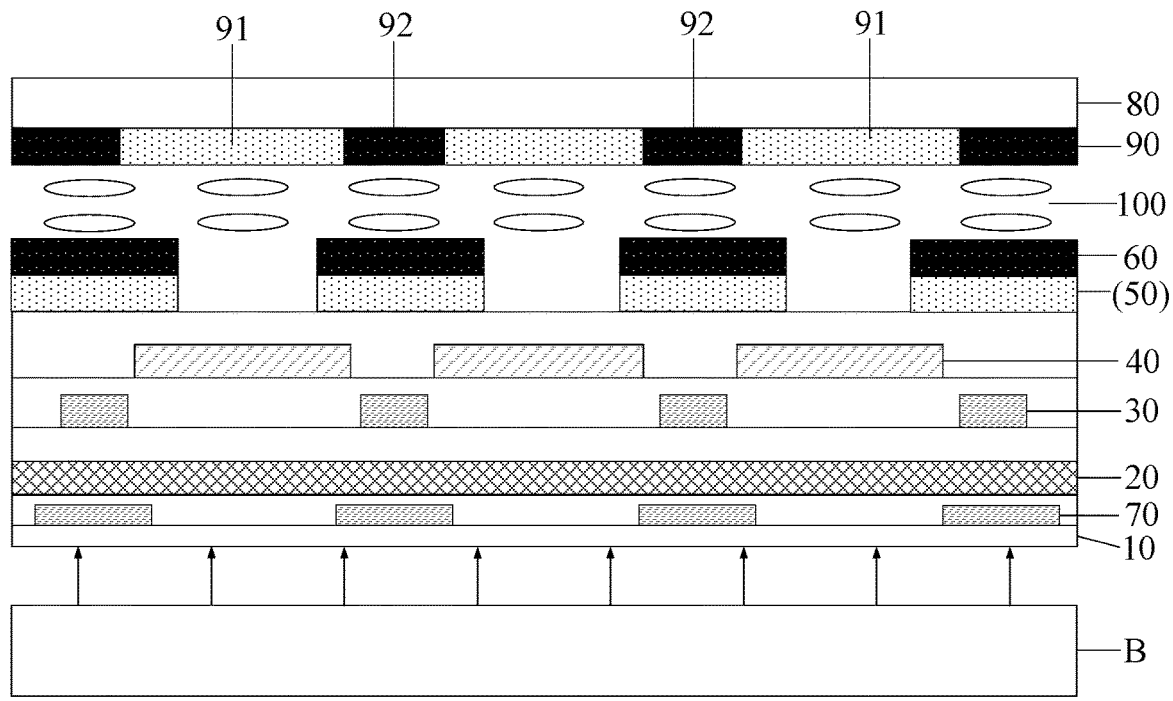
FIG. 17 is a first schematic diagram of a cross-sectional structure of a display device according to an embodiment of the present disclosure.
Figure 18:
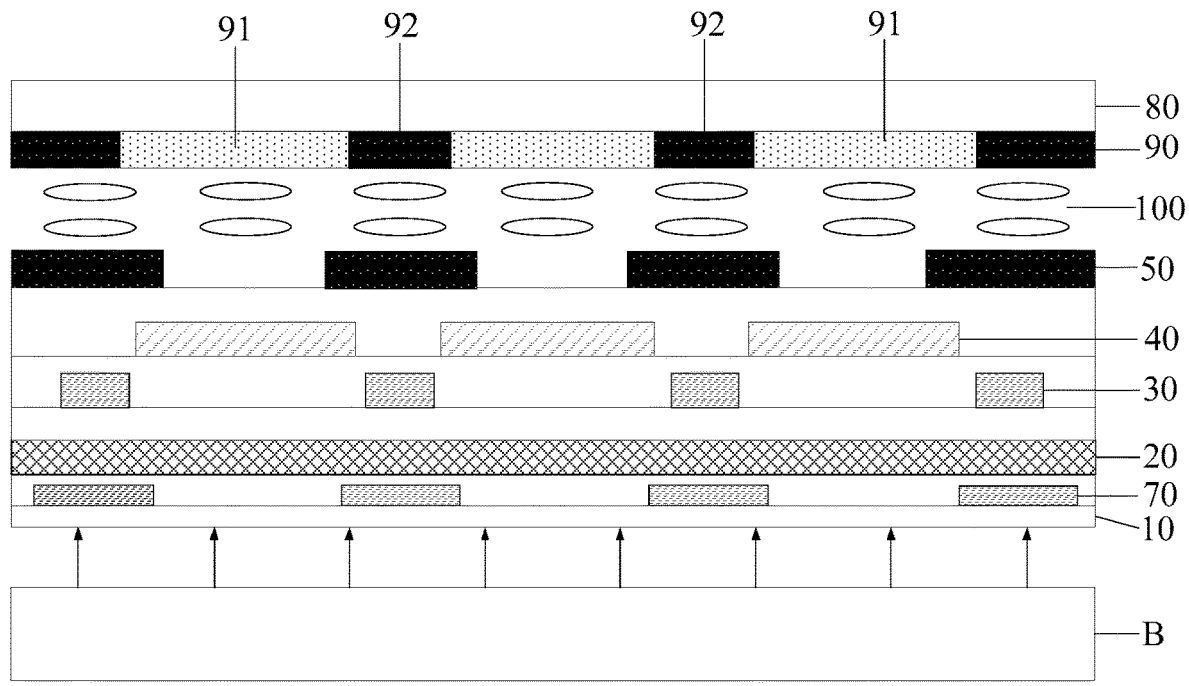
FIG. 18 is a second schematic diagram of a cross-sectional structure of a display device according to an embodiment of the present disclosure.

Based on the same inventive concept, embodiments of the present disclosure further provide a display device. FIG. 17 and FIG. 18 are schematic diagrams of a cross-sectional structure of a display device according to an embodiment of the present disclosure.

As shown in FIG. 17 and FIG. 18, the display device according to embodiments of the present disclosure includes a backlight module B, and any above display panel located at a light emitting side of the backlight module.

When the common electrode includes the transparent conductive layer (50) and the light shielding layer 60, the structure of the display device is as shown in FIG. 17. When the common electrode 50 is made of a conductive light-shielding material, the structure of the display device is as shown in FIG. 18. Because the principle of solving the problem of the display device is similar to that of the display panel described above, the implementation of the display device can be referred to the implementation of the display panel, and the repetition is omitted.

The display device according to embodiments of the present disclosure may be applied to the field of near-eye display, and the display device may be a virtual reality (VR) display device or an augmented reality (AR) display device, which is not limited herein.

Although embodiments of the present disclosure have been described, those of skill in the art may otherwise make various modifications and variations to these embodiments once they are aware of the basic inventive concept. Therefore, the claims intend to include embodiments as well as all these modifications and variations falling within the scope of the present disclosure.

Apparently, those skilled in the art can make various modifications and variations to embodiments of the present disclosure without departing from the spirit and scope of embodiments of the present disclosure. In this way, if the modifications and variations of embodiments of the present disclosure fall within the scope of the claims of the present disclosure and their equivalent technologies, the present disclosure is also intended to include these modifications and variations.

What is claimed is:

1. A display panel, comprising:
   a first base substrate;
   a driving layer, at a side of the first base substrate;
   a plurality of pixel electrodes, at a side of the driving layer away from the first base substrate, wherein each of the pixel electrodes is electrically connected with the driving layer;
   a common electrode, at a side of the pixel electrodes away from the driving layer, wherein the common electrode is insulated from the pixel electrodes; the common electrode comprises a plurality of openings for exposing the pixel electrodes, at least a partial region of the common electrode is opaque, and an orthographic projection of a partial region of the common electrode between two adjacent openings which is opaque on the first base substrate and an orthographic projection of either of the pixel electrodes exposed by the two adjacent openings on the first base substrate have an overlapping area;

a reflection layer, between the first base substrate and the driving layer; wherein the reflection layer comprises a plurality of openings for exposing the pixel electrodes, the orthographic projection of the partial region of the common electrode which is opaque on the first base substrate completely covers an orthographic projection of the reflection layer on the first base substrate.

2. The display panel according to claim 1, wherein the common electrode comprises:

a transparent conductive layer, at a side close to the pixel electrodes;

a light shielding layer, at a side of the transparent conductive layer away from the pixel electrodes;

wherein each of the transparent conductive layer and the light shielding layer comprises openings for exposing the pixel electrodes, an orthographic projection of the light shielding layer on the first base substrate is within a range of an orthographic projection of the transparent conductive layer on the first base substrate.

3. The display panel according to claim 2, wherein a width of the light shielding layer between two adjacent openings comprised in the light shielding layer is smaller than a width of the transparent conductive layer between two adjacent openings comprised in the transparent conductive layer.

4. The display panel according to claim 3, wherein the width of the light shielding layer between two adjacent openings comprised in the light shielding layer is 1.8 μm to 2.2 μm.

5. The display panel according to claim 2, wherein a material of the light shielding layer is metal molybdenum.

6. The display panel according to claim 4, wherein a width of the reflection layer between two adjacent openings comprised in the reflection layer is 1.8 μm to 2.3 μm.

7. The display panel according to claim 1, wherein the common electrode is made of a conductive light-shielding material.

8. The display panel according to claim 7, wherein a width of the common electrode between two adjacent openings comprised in the common electrode is 2.8 μm to 3.4 μm.

9. The display panel according to claim 7, wherein a material of the common electrode is metal molybdenum.

10. The display panel according to claim 8, wherein a width of the reflection layer between two adjacent openings comprised in the reflection layer is 2.3 μm to 3.3 μm.

11. The display panel according to claim 1, wherein the driving layer comprises:

a plurality of scanning signal lines, extending in a first direction and arranged in a second direction, wherein the first direction intersects with the second direction;

a plurality of data signal lines, extending in the second direction and arranged in the first direction; wherein the plurality of scanning signal lines and the plurality of data signal lines define a plurality of sub-pixel units, and the pixel electrodes correspond to the sub-pixel units one by one;

a plurality of transistors, corresponding to the sub-pixel units one by one; wherein control electrodes of the transistors are electrically connected to corresponding scanning signal lines, first electrodes of the transistors are electrically connected to corresponding data signal lines, and second electrodes of the transistors are electrically connected to corresponding pixel electrodes;

the display panel further comprises:

an insulating layer, between each of the pixel electrodes and the common electrode;

a second base substrate, at a side of the common electrode away from the pixel electrodes, wherein a distance between the second base substrate and the common electrode is a set distance;

a color film layer, at a side of the second base substrate facing the common electrode; wherein the color film layer comprises a plurality of color film units corresponding to the sub-pixel units one by one and a black matrix for separating the color film units;

a liquid crystal layer, between the common electrode and the color film layer.

12. The display panel according to claim 11, wherein;

an orthographic projection of the data signal line on the first base substrate and the orthographic projection of the pixel electrode on the first base substrate do not overlap with each other.

13. The display panel according to claim 12, wherein the orthographic projection of the data signal line on the first base substrate is within a range of an orthographic projection of the reflection layer on the first base substrate.

14. A display device, comprising a backlight module, and the display panel according to claim 1 at a light emitting side of the backlight module.

15. The display device according to claim 14, wherein the display device is a virtual reality display device or an augmented reality display device.

16. The display panel according to claim 1, wherein all regions of the common electrode are opaque.

* * * * *